US011126447B2

United States Patent
Curtis et al.

(10) Patent No.: US 11,126,447 B2
(45) Date of Patent: *Sep. 21, 2021

(54) FACILITATING USER CONFIGURED ASSISTANCE REQUESTS THROUGH A CHAT IN A VIRTUAL SPACE

(71) Applicant: Kabam, Inc., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,907

(22) Filed: Sep. 16, 2020

(65) Prior Publication Data
US 2020/0409730 A1    Dec. 31, 2020

Related U.S. Application Data

(63) Continuation of application No. 16/510,315, filed on Jul. 12, 2019, now Pat. No. 10,802,850, which is a continuation of application No. 15/676,782, filed on Aug. 14, 2017, now Pat. No. 10,387,176, which is a continuation of application No. 14/645,392, filed on Mar. 11, 2015, now Pat. No. 9,733,955, which is a
(Continued)

(51) Int. Cl.
*G06F 15/16* (2006.01)
*G06F 9/451* (2018.01)
*H04L 12/58* (2006.01)
*A63F 13/00* (2014.01)
*H04L 12/18* (2006.01)
*G06F 3/0484* (2013.01)
*G06F 3/048* (2013.01)

(52) U.S. Cl.
CPC .............. *G06F 9/453* (2018.02); *A63F 13/00* (2013.01); *G06F 3/04842* (2013.01); *H04L 12/1827* (2013.01); *H04L 51/04* (2013.01); *H04L 51/046* (2013.01); *H04L 51/32* (2013.01); *G06F 3/048* (2013.01)

(58) Field of Classification Search
None
See application file for complete search history.

(56) References Cited

U.S. PATENT DOCUMENTS

| | | |
|---|---|---|
| 5,909,794 A | 6/1999 | Molbak |
| 6,148,328 A | 11/2000 | Cuomo |

(Continued)

*Primary Examiner* — Quang N Nguyen
(74) *Attorney, Agent, or Firm* — Esplin & Associates, PC

(57) ABSTRACT

A system and method for facilitating a user to initiate and accept an assistance request through a chat session is disclosed. Controls may be provided in a graphical chat interface to enable the user to specify inputs to request assistance from other users participating in the chat session. An assistance request may be generated and communicated to those users through the chat session. Graphical representation for the assistance request and controls that facilitate the users to accept the assistance request may be provided in the graphical chat interface. Upon an acceptance to the assistance request by a responding user through the graphical chat interface, an assistance command may be generated and executed in the virtual space.

17 Claims, 13 Drawing Sheets

Related U.S. Application Data continuation of application No. 13/859,637, filed on Apr. 9, 2013, now Pat. No. 8,984,080.

(56) References Cited

U.S. PATENT DOCUMENTS

| | | |
|---|---|---|
| 6,219,045 B1 | 4/2001 | Leahy |
| 7,056,217 B1 | 6/2006 | Pelkey |
| 7,194,505 B2 | 3/2007 | Yano |
| 7,240,093 B1 | 7/2007 | Danieli |
| 7,325,034 B2 | 1/2008 | Douglis |
| 7,925,702 B2 | 4/2011 | Rood |
| 7,958,457 B1 | 6/2011 | Brandenberg |
| 8,050,987 B2 | 11/2011 | Liu |
| 8,214,344 B2 | 7/2012 | Kruglick |
| 8,255,542 B2 | 8/2012 | Henson |
| 8,396,932 B2 | 3/2013 | Pattekar |
| 8,543,926 B2 | 9/2013 | Giles |
| 8,588,394 B2 | 11/2013 | Schlesener |
| 8,627,212 B2 | 1/2014 | Riley |
| 8,737,598 B2 | 5/2014 | Bruce |
| 8,843,851 B1 | 9/2014 | Gotchy |
| 8,903,927 B2 | 12/2014 | Chen |
| 8,984,080 B1 | 3/2015 | Curtis |
| 8,990,715 B1 | 3/2015 | Harp |
| 9,062,583 B1 | 6/2015 | Harp |
| 9,295,916 B1 * | 3/2016 | Harrington ............. A63F 13/50 |
| 9,304,819 B2 | 4/2016 | Faus |
| 9,332,043 B1 | 5/2016 | Caldarone |
| 9,533,218 B1 * | 1/2017 | Lin ......................... A63F 13/00 |
| 9,649,554 B1 | 5/2017 | Akpan |
| 10,387,176 B1 | 8/2019 | Curtis |
| 2003/0037110 A1 | 2/2003 | Yamamoto |
| 2006/0020697 A1 | 1/2006 | Kelso |
| 2008/0201438 A1 | 8/2008 | Mandre |
| 2008/0263446 A1 | 10/2008 | Altberg |
| 2008/0263458 A1 | 10/2008 | Altberg |
| 2009/0113452 A1 | 4/2009 | Grigsby |
| 2009/0235182 A1 | 9/2009 | Kagawa |
| 2011/0107239 A1 | 5/2011 | Adoni |
| 2011/0302509 A1 | 12/2011 | Leacock |
| 2011/0307807 A1 | 12/2011 | Norby |
| 2012/0124147 A1 | 5/2012 | Hamlin |
| 2012/0283011 A1 | 11/2012 | Van Luchene |
| 2012/0283014 A1 | 11/2012 | Van Luchene |
| 2013/0066988 A1 | 3/2013 | Levinson |
| 2013/0109002 A1 | 5/2013 | Howard |
| 2013/0198304 A1 | 8/2013 | Jung |
| 2013/0254304 A1 | 9/2013 | Van Nest |
| 2014/0143687 A1 | 5/2014 | Tan |
| 2014/0149043 A1 * | 5/2014 | Beisel ................. E21B 47/06 702/11 |
| 2014/0232815 A1 | 8/2014 | Cili |
| 2014/0337093 A1 * | 11/2014 | Jain ...................... H04L 67/306 705/7.29 |
| 2014/0364237 A1 * | 12/2014 | Read ...................... A63F 13/00 463/40 |
| 2016/0049043 A1 * | 2/2016 | Tennenhaus .......... G07F 17/326 463/25 |
| 2016/0271496 A1 * | 9/2016 | Behmaram-Mosavat ................... A63F 13/10 |
| 2018/0032246 A1 | 2/2018 | Kim |
| 2019/0299103 A1 * | 10/2019 | Lee ....................... G06Q 50/01 |
| 2019/0332401 A1 | 10/2019 | Curtis |

* cited by examiner

Graphical Chat UI For User 2

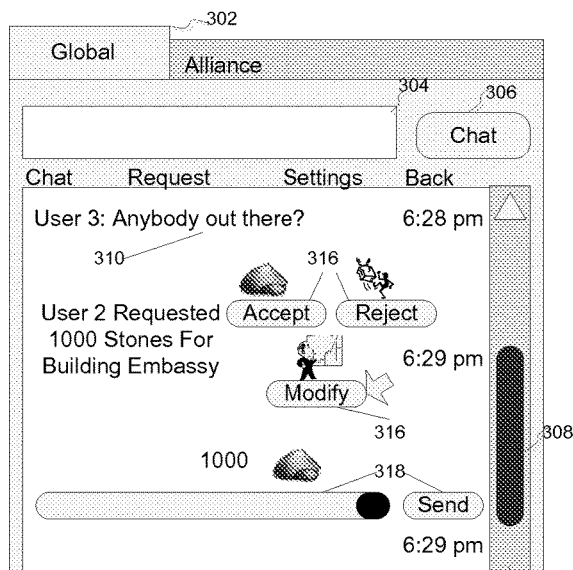
FIG. 3D
*300*
Graphical Chat UI For User 1
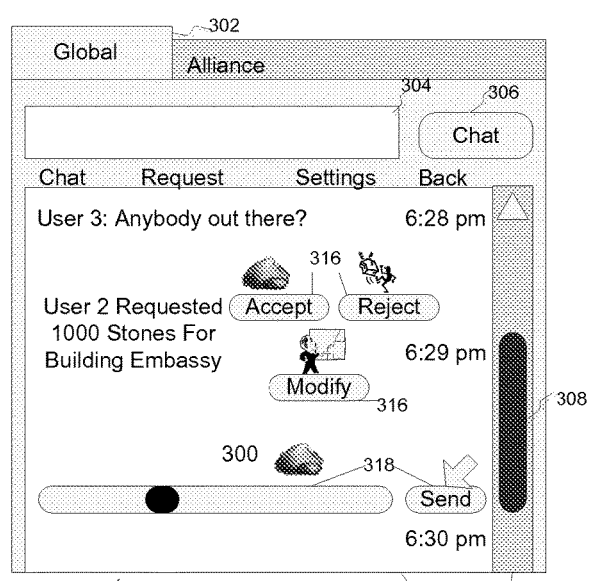
FIG. 3E
*300*
Graphical Chat UI For User 1
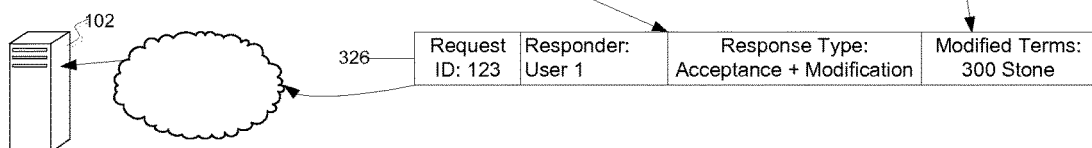

400 Graphical Chat UI For User 2

400 Graphical Chat UI For User 2

FACILITATING USER CONFIGURED ASSISTANCE REQUESTS THROUGH A CHAT IN A VIRTUAL SPACE

FIELD OF THE DISCLOSURE

This disclosure relates to facilitating user collaboration through a graphical chat interface provided by a virtual space provider without requiring users to leave the graphical chat interface, the facilitated user collaboration includes initiating assistance request and accepting the assistance request using the graphical chat interface.

BACKGROUND

Systems that provide chat within a virtual space are known. Typically, in those systems, chat may be provided to facilitate textual communications between users in the virtual space. Systems that enable users to provide assistance to other users through game interfaces are also know. In those systems, controls may be provided in game interfaces for a user to provide assistance to another user in the game. Typically, through such controls, the user is required to take multiple steps to provide assistance. For example, a user may transport troops to another user by selecting a location controlled by another player (e.g., a city) in a game interface, specifying types and/or amount of troops to be transported to that location in a settings interface, and initiating execution of the specified troop transportation in the game. However, in those systems, a user may not proactively provide executable assistance request to other users.

SUMMARY

One aspect of the disclosure relates to facilitating user collaboration in a virtual space by enabling a user to initiate an assistance request through a graphical chat interface provided by a virtual space provider. Controls may be provided in the graphical chat interface to facilitate the user to submit the assistance request and to communicate the assistance request to other users through a chat session. The requested assistance may be readily executed in the virtual space upon acceptance of the assistance request by one or more responding users through the graphical chat interface. This may enhance user collaboration and/or social interaction in the virtual space by enabling the assistance requesting user to proactively initiate assistance requests that may be quickly and readily acted upon by other users in the chat session.

Another aspect of the disclosure relates to enabling users to accept assistance requests initiated by other users through the graphical chat interface and provide the requested assistance without having to take multiple steps required by conventional virtual space systems. Executable assistance requests communicated in a chat session may be presented through the chat interface and the responding users may provide the requested assistance by simply accepting the assistance request. In some implementations, controls may be provided in the graphical chat interface for responding users to modify one or more terms of the assistance requests. As so enabled, users may provide assistance in response to assistance requests through a graphical chat interface without having to taking actions in the virtual space through a virtual space interface. This may improve monetization and/or retention rate in the virtual space as users may provide assistance to other users in the virtual space while still engaging in social interactions in the chat.

In some implementations, a system configured to facilitate user configured assistance requests through a chat in the virtual space may include a server. The server may operate in a client/server architecture with one or more client computing platforms. The client computing platforms may be associated with the users of the virtual space. The server may be configured to execute one or more of a space module, a chat-request module, a chat module, a request-response module, and/or other modules. The client computing platforms may be configured to execute one or more of a space interface module, a chat interface module, a user response module, an assistance request module, and/or any other modules.

The space module may be configured to execute an instance of a virtual space. The space module may implement the instance of the virtual space to facilitate user interaction with the virtual space. Users may interact with the virtual space through collaboration that facilitates, for example, assistance between the users, coordination of their actions, sharing of virtual space information, virtual resources, virtual items, skills, abilities and/or other user elements between the users, negotiation, competition, social interaction, and/or any other collaborative activities. For example, within the instance of the virtual space, a user may request other users to provide assistance to complete an activity in the virtual space. Such an assistance request may be accepted by a responding user(s). Responsive to an acceptance of the assistance request, the space module may execute the acceptance in the virtual space.

Chat module may be configured to implement chat sessions to facilitate synchronous textual communications between users. The textual communications may include one or more of textual chat, instant messages, private messages, and/or other textual communications. The textual communications may facilitate the users to share information about the virtual space, engage in social interactions, recruit other users, invite other users to cooperate, and/or engage in any other activities enabled by the textual communications. The chat module may transmit the textual communications for presentation through graphical chat interfaces on client computing platforms.

Chat-request module may be configured to receive user inputs requesting assistance submitted through graphical chat interfaces. The received user inputs may specify one or more assistance objectives established by the requesting user, which may provide an opportunity and/or motivation for other users to assist and/or cooperate with the requesting user. Simultaneously or alternatively, the received user inputs may specify one or more virtual resources, virtual items, virtual entities, and/or any other components to be transferred to the assistance requesting user to further the assistance objective(s). Responsive to receiving such user inputs, the chat-request module may be configured to generate assistance requests. In some implementations, this may involve parsing the received user inputs requesting assistance, extracting assistance request parameters from the user inputs, and constructing the assistance request using predetermined syntax. Responsive to generation of the assistance requests, the chat-request module may be configured to communicate the assistance requests to other users through a chat session.

The response-request module may be configured to receive user acceptance to the assistance requests and to generate assistance commands executable by the space module. A received user acceptance may specify that a responding user has accepted a corresponding assistance request, and, in some examples, may specify that the responding user has modified terms of the requested assistance. Responsive to receiving such an acceptance to the assistance request, the response-request module may generate one or more assistance commands executable by the space module to effectuate the assistance provided through the acceptance. This may involve parsing the user acceptance, extracting assistance parameters, and constructing assistance commands using predetermined syntax.

The space interface module may be configured to generate space interfaces on a display coupled to or included in a client computing platform associated with a user. The generated space interfaces may present views of virtual space to the user and/or provide one or more virtual space controls to facilitate user actions in the virtual space.

The chat interface module may be configured to generate graphical chat interfaces to facilitate textual communications between the users. The generated graphical chat interfaces may replace space interfaces generated by the space interface module on the display coupled to or included in the client computing platform. That is, when presented on the display, the generated chat interfaces and space interfaces are mutually exclusive such that the user may not access controls provided by the space interfaces when the chat interfaces are presented on the display, and vice versa. The generated graphical chat interface may present on the display communication inputs included in a chat session, which may comprise assistance requests. The chat interface module may be configured to determine an assistance request from other type(s) communication inputs in the chat session. Responsive to such a determination, the chat interface module may generate a visual display for the assistance request. Examples of such a visual display may include an image, a graphical art, an animation, and/or any other visual display that may visually describe the assistance request. Simultaneously or alternatively, the chat interface module may also generate one or more controls for the user to provide inputs to accept the assistance request. In some implementations, the generated graphical chat interface may include controls for the user to initiate an assistance request.

The user response module may be configured to determine use acceptance to the assistance requests based on user inputs via the graphical chat interface generated by the chat interface module. This may involve parsing the user inputs received from the graphical chat interface, extracting assistance parameters from the received user inputs and determining user acceptance to the assistance request. Responsive to a determination of user acceptance to the assistance request, the user response module may communicate the user acceptance to the requesting user through a chat session.

The assistance request module may be configured to generate communication inputs to a chat session based on user inputs requesting assistance submitted through the graphical chat interface. This may involve generating communication inputs transmittable in a chat session by parsing the user inputs submitted through the graphical chat interface. Responsive to the determined communication inputs, the assistance request module may communicate the generated communication inputs to other users through the chat session.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3D illustrate an example of graphical chat interface facilitating a user to accept the assistance request communicated through a chat session.

FIG. 3E illustrate another example of graphical chat interface facilitating a user to accept the assistance request communicated through a chat session.

DETAILED DESCRIPTION

Figure 1:
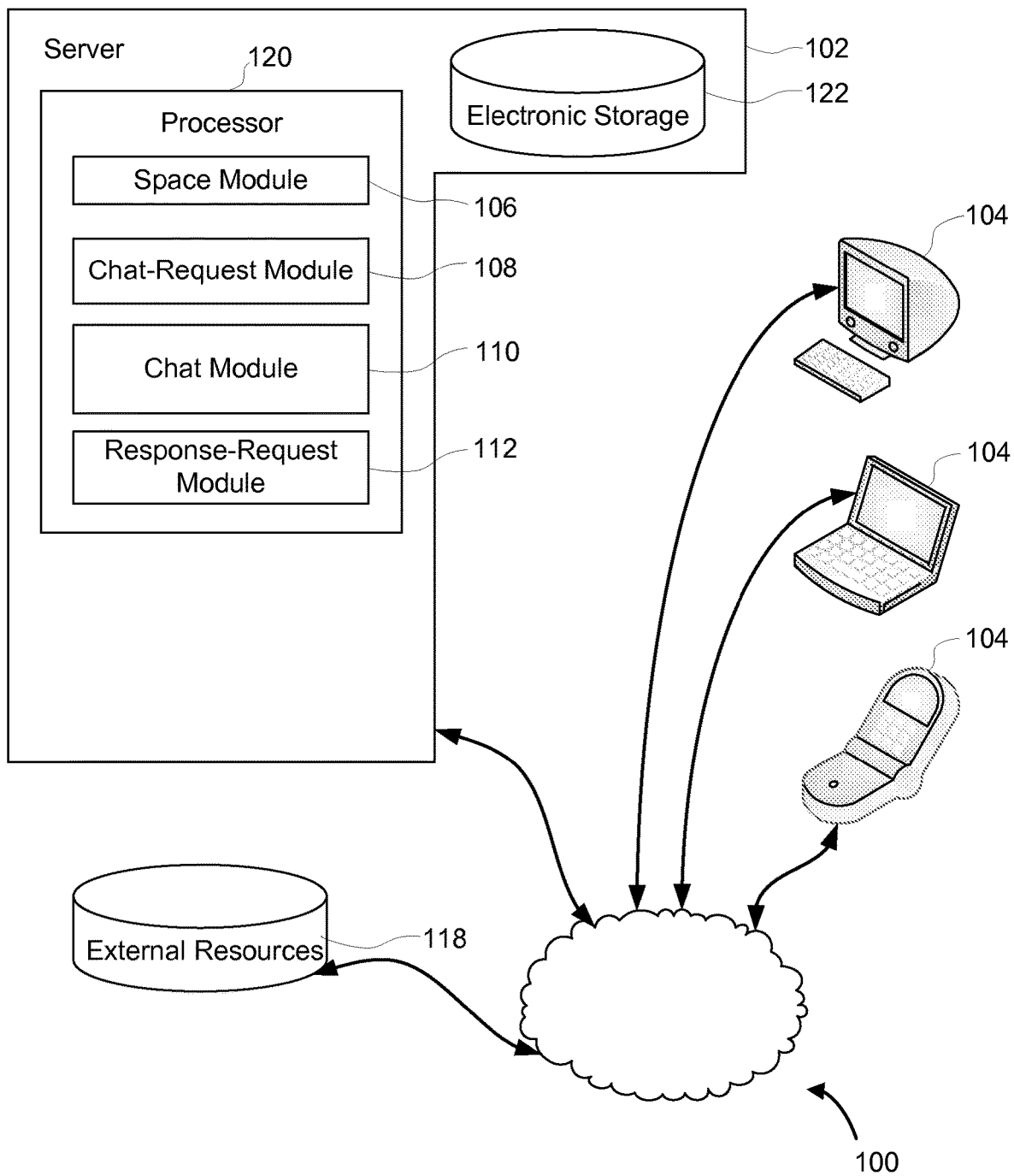
FIG. 1 illustrates one example of a system configured to facilitate user configured assistance requests through a chat in a virtual space.

FIG. 1 illustrates one example of a system 100 configured to facilitate user configured assistance requests through a chat session in a virtual space. In system 100, a user may specify inputs through a graphical chat interface to request assistance from other users available in the chat session. A corresponding assistance request may be generated based on the user inputs and communicated to other user through the chat session. One or more users in the chat session may accept the assistance request and the acceptances may be executed in the virtual space. This may enhance user collaboration in the virtual space such that user assistance may be requested and fulfilled through graphical chat interfaces directly.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a chat-request module 108, a chat module 110, a response-request module 112, and/or other modules.

Space module 106 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user, with which it is associated. The user controlled element(s) may move through and interact with the virtual space (e.g., non-user characters in the virtual space, other objects in the virtual space). The user may initiate maneuvers to direct the movements of controlled character in the virtual space. The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Within the instance of the virtual space executed by space module 106, virtual space activities may be provided to users to interact with the virtual space. Examples of virtual space activities may include constructing, upgrading, demolishing buildings, training, marching, reinforcing, reassigning, recruiting, arranging formations, and/or transporting troops, attacking, developing, creating, demolishing and/or defending cities, realms, kingdoms, and/or any other virtual space location entities, crafting or transporting virtual items, attacking, and/or interacting with non-player characters (NPCs herein-after) and/or other user characters, researching for skills levels, experiences, mining and/or prospecting for virtual resources, completing missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities.

The user may participate in the instance of the virtual space by initiating actions in the virtual space. In some implementations, the actions may be enabled by physical controls provided by the client computing platforms 104, such as but not limited to, play buttons, joysticks, motion sensors, cameras, keyboards, mouse, and/or any other physical controls provided by client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled to initiate actions in the virtual space, the user may provide inputs to initiate virtual space maneuvers, to participate in virtual activities and/or engage in other interactions within the virtual space. For example, user may provide an input specifying an amount of troops to be marched to a virtual space location when defending that virtual space location. Commands may be generated for the user initiated actions and may be executed by the space module 106 in the virtual space such that the user requested interactions with the virtual space may be effectuated in the virtual space following the execution. Execution of such a command by the space module 106 may produce changes to the virtual space state, which may reflect progresses and/or results of the user initiated actions.

Within the instance of the virtual space executed by space module 106, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Some virtual space activities may require consumption of virtual resources. During the virtual space activities, an amount of the resources required by the virtual space activities may be increased or decreased in the user inventory to reflect a consumption (including exhaustion) or procurement of the resources in the virtual space by the user. Some virtual space activities may be associated with time requirements for them to complete in the virtual space. Length of time durations required by different virtual space activities may vary based on various factors specific to the virtual space activities. For example, constructing a level 1 wall in the virtual space may require 30 minutes build time; constructing a level 2 wall may require 1 hour build time; constructing a level 3 wall may require 2 hour build time; constructing a level 4 wall may require 3 hour build time; and so on. Such required duration for an activity to complete within the virtual space may be shortened by user consumption of virtual items and/or resources. For example, hourglasses may be provided to users to shorten build time of a wall by various amount of time.

In some examples, virtual space activities may require user inputs from the users to facilitate participation of the activities by the users. As a virtual space activity progresses within the virtual space, one or more events within the virtual space may occur in relation to the virtual space activity. For example, during a troop marching activity engaged by a user, troops may be fatigued due to marching over unexpected treacherous terrains and therefore require morale boost to be provided by the user, e.g., by consuming virtual space resources. In another example, during a mining activity engaged by the user, NPC intruders (e.g., barbarians) may roam around the mines owned by the user and thus require the user to transport troops to defend the mines.

Within the instance of the virtual space executed by space module 106, users may interact with one another. Interaction between the users may include user collaboration that coordinates the user actions in the virtual space, virtual resources, virtual items, skills, abilities and/or other user elements sharing between the users, assistance from one user to another and/or any other collaboration between the users to reach a collaboration objective. In some examples, for enhanced collaboration in the virtual space, alliances may be established to specify alliance agendas and enforce rules of conducts by which alliance members should conduct toward each other.

The user collaboration may include assistance between the users. A user may request other users to provide assistance to complete an activity in the virtual space. Such an assistance request may be accepted by responding user(s). The responses may be executed by the space module to effectuate the assistance provided in the acceptances. Such assistance may include, for example, transferring virtual resources, items and/or entities from the responding user's inventory to the requesting user's inventory within the virtual space. The transferred resources, items, and/or entities may be consumed or utilized to further the assistance objective established by the requesting user.

By way of non-limiting examples, user assistance in the virtual may include help defend virtual locations controlled by a requesting user, help the assistance receiving user speed up research time, construction and/or upgrade time of buildings, help train troops of the requesting user, transport troops to the requesting user controlled virtual space locations, provide the requesting user skills, experience, expertise and/or abilities, cooperate with the requesting user in activities, missions, quests, campaigns in the virtual space, to attack common enemies, NPC, monsters, characters and/or virtual space locations controlled by other users, to explore the virtual space with the requesting user, and/or any other user assistance. Such user assistance may be executed and effectuated in the virtual space by the space module 106, and in some examples may result in transfers of virtual resources, virtual items, virtual space entities and/or any other virtual space components from the assistance providing user to the assistance receiving user.

Chat-request module 108 may be configured receive user inputs requesting assistance submitted through graphical chat interfaces. The received user inputs may specify one or more assistance objectives established by the requesting user, which may provide an opportunity and/or motivation for other users to assist and/or cooperate with the requesting user. Such assistance objectives may include, but not limited to, helping defend a city, helping attack a monster, helping construct a building, helping research for a skill, helping train troops, helping explore virtual space, and/or any other assistance objectives that may provide an opportunity and/or motivation for other users to assist the requesting user.

Simultaneously or alternatively, the received user inputs may specify one or more virtual resources, virtual items, virtual entities, and/or any other components to be transferred to the assistance requesting user to further the assistance objective(s). By way of non-limiting examples, the user inputs may request an amount of stone, wood, and ore to be transferred to the requesting user for upgrading a knight's hall in the requesting user's city; may request that a number of troops to be transported to the requesting user's city to strengthen the city defense; may request a virtual item, a skill, or an ability to be shared with the requesting user for a period of time; may request to attack/defend a virtual space location, to undertake a quest, to explore a virtual space area, just to name a few.

The user inputs requesting assistance may be received by the chat-request module 108 through, for example, graphical chat interfaces implemented on the client computing platforms 104. For instance, controls may be provided in a graphical chat interface that allows the requesting user to request virtual resources to be transferred from alliance members to the requesting user through a chat session. Accordingly, such user inputs may be transmitted to the chat-request module 108 through the graphical chat interface.

Responsive to receiving such user inputs, the chat-request module 108 may be configured to generate assistance requests. In some implementations, the chat-request module 108 may be configured to parse the received user inputs, extract assistance request parameters from the user inputs, and construct the assistance request using assistance request syntax predetermined by provider, administrator, moderator, and/or any other entities related to the virtual space at a configuration stage of system 100. For example, the parse assistance parameters may include chat session(s) addressed, assistance objective(s), type, amount of virtual space resources, items, and/or entities that may be contributed by a responding user towards the assistance objective, a time frame for assistance, a location for assistance and/or any other assistance parameters.

The chat-request module 108 may be configured to communicate the generated assistance requests through chat sessions within the virtual space. In some implementations, for such communication, the chat-request module 108 may be configured to parse the received user inputs requesting assistance for requested recipients and determine one or more chat sessions through which these recipients may be reached. In some examples, the received user inputs requesting assistance may not specify any specific users the request is directed to, but rather any user available in a chat session. In any case, based on the received user inputs, the chat-request module 108 may be configured to generate communication inputs using communication input syntax predetermined by provider, administrator, moderator, and/or any other entities related to the virtual space. In some implementations, the chat-request module 108 may be configured to serialize communication of the assistance requests based on an order by which they were received by the chat-request module 108.

Chat module 110 may be configured to implement chat sessions to facilitate textual communications between users. The textual communications may include one or more of textual chat, instant messages, private messages, and/or other communications. The textual communications may facilitate the users to share information about the virtual space, engage in social interactions, recruit other users, invite other users to cooperate in the virtual space and/or engage in any other activities enabled the textual communication. The textual communications may be received and entered by the users via their respective client computing platforms 104 and may be routed to and from the appropriate users through server 102 via a chat session implemented by the chat module 110. A chat session may include complete textual communication inputs from users who have participated in the chat session. The textual communication inputs in a chat session may be stored on and accessed from the electronic storage 122. In some examples, a chat session may be open ended within the virtual space such that it does not finish until a provider, administrator, moderator, and/or any other entities related to the virtual space decide not to provide the chat session through the chat module 110. In some other examples, a chat session may be initiated and stopped by users at any time as desired.

In some implementations, chat sessions may be implemented by the chat module based on user relationships. A global chat session may be implemented such that communication inputs from users may be received by any other users who participate in the global chat session. Typically, no specific virtual space relationships may be required for users to participate in the global chat session. Such a global chat session may be open ended and users may join or leave the global chat session at any time as desired. An alliance chat session may be implemented differently from the global chat session in that only alliance members may participate in the alliance chat session. Typically, individual alliance chat sessions are implemented by the chat module for corresponding alliances in the virtual space. Like the global chat session, an alliance chat sessions may allow alliance members to join or leave the alliance chat session at any time and may be open ended. A private chat session may be implemented by the chat module 110 to facilitate user controlled communication between or among individual users. For example, a user may initiate a private chat session to communicate with one or more other users. Unlike global or alliance chat sessions, private chat sessions may not be open ended such that the users may initiate and stop the private chat sessions as desired. It is understood that the above examples of different types of chat sessions are described only for illustration purposes, and thus are not intended to be limiting. One of ordinary skill in the art will appreciate the chat module 110 may implement chat sessions in any other ways to facilitate communication between users in other examples.

In any case, the textual communications between the users in a chat session implemented by the chat module 110 may be either synchronous or asynchronous. In synchronous communication, individual users may receive communication inputs from other users in real-time or near real-time, i.e., without significant delay. In asynchronous communication, time delays may occur between sending communications inputs and receiving the sent communication inputs. In some implementations, the chat module 110 may be configured to mediate asynchronous communication to ensure correct receiving orders.

In some implementations, the textual communications between users facilitated by the chat module 110 may be location based. For example, synchronous communication may be provided by the chat module to users with user characters engaging in activities within an area of virtual space. For instance, users located in a specific realm of virtual space may engage in real-time or near real-time communication with one another. On the other hand, asynchronous communication may be provided to users with user characters located in different areas of virtual space.

In any case, the chat module 110 may be configured to receive and transmit communication inputs in a chat. For such transmission, the chat module 110 may be configured to mediate the communication inputs using, for example, semaphores, linked-list, priority list, flag, time-stamps, and/or any other methods to ensure correct transmission order of the communication inputs. For effectuating the transmission of the communication inputs to individual client computing platforms 104, the chat module may be configured to package the communication inputs into packets that may be routed to the client computing platforms by the underlying networks as shown in FIG. 1.

The chat module 110 may be configured to implement chat sessions that include assistance requests generated by the chat-request module 108. In some implementations, the chat module 110 may determine the assistance requests from other type(s) of communication inputs in the chat sessions, determine the identity information of the requesting user, determine time stamps when the assistance requests were received in the chat session, and/or determine any other information related to the assistance requests.

The response-request module 112 may be configured to receive user acceptance to the assistance requests and to generate commands to effectuate the assistance provided through the received responses in the virtual space. A received user acceptance may specify that a responding user has accepted a corresponding assistance request, and, in some examples, may specify that the responding user has modified terms of the requested assistance. By way of non-limiting examples, the modified terms may include a different amount of virtual resources or virtual space entities from that requested, a different type of virtual resources from that requested, a different time frame to assist from that requested, a different virtual space location for assistance from that requested and/or any other modified terms that may be included in a response to an assistance request.

In some implementations, the response-request module 112 may receive the acceptance to assistance requests from the chat module 110. For example, a responding user may send the acceptance through a chat session by acting on the request in the chat session. Such an acceptance may be received and recognized by the chat module 110, which may be configured to push the acceptance to the response-request module 112 for further action. However, this is not necessarily the only case. In another example, the acceptance may be transmitted to the response-request module 112 directly from a client platform 104 associated with the responding user. In that example, response-request module 112 may be configured to interact with a network module of system 100 to receive the acceptance directly from the user without, for example, examining the chat session.

In any case, responsive to receiving user acceptance to the assistance requests, the response-request module 112 may be configured to generate one or more assistance commands to effectuate the assistance provided through the user responses. In the case where the acceptance indicates that the responding user has accepted the assistance request as is, the response-request module 112 may be configured to generate the assistance commands based on the assistance request parameters extracted by the chat-request module 108. In the case where the acceptance indicates that the responding user has accepted the request but modified the terms of the assistance requested, the response-request module 112 may be configured to parse the received acceptance to extract assistance parameters as provided by the responding user. Syntax for acceptance to assistance request may be determined by the provider, administrator, moderator, and/or any other entities related to the virtual space at a configuration stage of system 100 and may be used for parsing such acceptances.

Based on the determined assistance parameters, the response-request module 112 may generate one or more assistance commands executable by the space module 106 to effectuate the assistance provided by the response in the virtual space. For example, in the case where a user response specifies that it accepts a request to transfer 1000 stones toward the requesting user's upgrading of a knight's hall, the response-request module 112 may generate a command to transfer the 1000 stones from the responding user's inventory to the requesting user's inventory and subsequently consume the 1000 stone in the requesting user's inventory as required by the upgrade of the requesting user's knight's hall.

The server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 120 may be operatively linked via some other communication media.

Figure 2:
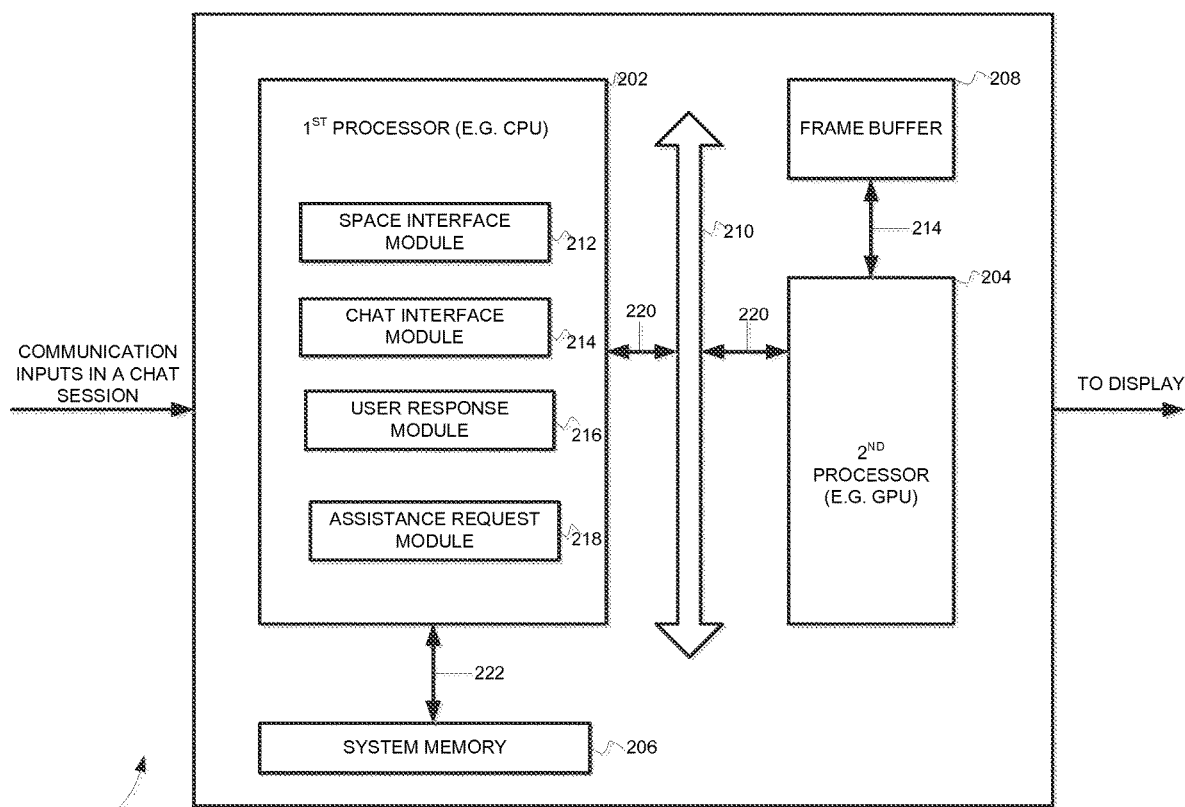
FIG. 2 illustrates one example of a client computing platform as shown in FIG. 1.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms. An example of computing platform 104 is illustrated in FIG. 2.

External resources 118 may include sources of information, hosts and/or providers of virtual environments outside of system 118, external entities participating with system 100, and/or other resources. In some implementations, some or all of the functionality attributed herein to external resources 118 may be provided by resources included in system 100.

Server 102 may include electronic storage 122, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112 and/or other modules. Processor 120 may be configured to execute modules 106, 108, 110, 112 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112 are illustrated in FIG. 1 as being implemented within a single processing unit, in implementations in which processor 122 includes multiple processing units, one or more of modules 106, 108, 110, 112, 114, 116 may be implemented remotely from the other modules. The description of the functionality provided by the different modules 106, 108, 110, 112, 114, 116 described below is for illustrative purposes, and is not intended to be limiting, as any of modules 106, 108, 110, 112 may provide more or less functionality than is described. For example, one or more of modules 106, 108, 110, 112 may be eliminated, and some or all of its functionality may be provided by other ones of modules 106, 108, 110, 112. As another example, processor 120 may be configured to execute one or more additional modules that may perform some or all of the functionality attributed below to one of modules 106, 108, 110, 112.

It is understood that the above description of system 100 is merely illustrated as one example of a system configured to facilitate a user configured assistance request through a chat provided by a virtual space in accordance with the disclosure. It should be appreciated that in some examples, a localized system 100 may be configured according to a stand-alone architecture such that the system configured to provide rewards to a user in a virtual space based on user performance of gesture in accordance with the disclosure may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU may be configured to communicate virtual space state information to the GPU through any suitable wired or wireless communications such as, but not limited to, a point-to-point communication like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate in concert to achieve all or some of the functions of 106, 108, 110, 112, as described above.

FIG. 2 illustrates one example of client computing platform 104 as shown in FIG. 1. It will be described with references to FIG. 1. The computing platform 104 may include any suitable device, for example, handheld device (e.g., mobile or smart phone, tablet, etc.), computer server, a laptop computer, desktop computer, media center, gaming console, set top box, printer or any other suitable device, to name a few. In this example, the client computing platform 104 employs a first processor 202 operatively connected to system memory 206 and a second processor 204 operatively connected to frame buffer 208. This is merely illustrative, as client computing platform 104 may be implemented with more or less processors than those shown. One or both of first processor 202 and/or second processor 204 may include a plurality of processing units operating in coordination in some other examples. As shown in this example, the first and second processors may be connected using a data bus or point to point connections, such the system bus 210, which transfers data between each structure of the client computing platform 104. Although not shown, the client computing platform 104 may also include an input device, such as but not limited to, touch screen, motion sensor, mouse, trackball, touchpad, digitizing tablet, joystick, pointing stick, keypad, keyboard, camera, remote controller or any other suitable input device. The client computing platform 104 may also include a display, which is also not shown in this example. The display may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touchscreen. One of ordinary skill in the art will recognize other suitable structure, such as but not limited to, a storage device, a memory controller, an i/o subsystem and/or any other structure may also be included in the system 100.

In this example, the first processor 202 may include a host central unit (CPU) having multiple cores however any suitable processor may be employed including a DSP, APU, GPGPU or any other suitable processor or logical circuitry. The first processor 202 may be bi-directionally connected to other components of the client computing platform 104 via the system bus 210. The second processor 204 may include a graphics processing unit (GPU), which drives the display device via a display connector, such as analog display connectors, for example, composite video, S-Video, VGA, digital display connectors, for example, HDMI, mini-DVI, micro-DVI, wireless connectors or any other suitable connectors. It is understood that, in some other examples of client computing platform 104, the first processor 202 may be integrated with the second processor 204 to form a general processor. In addition, although the system memory 206 and the frame buffer 208 are shown in FIG. 2 as two separate components in the client computing platform 104, it is also understood that a unified memory architecture that can accommodate all the processors may also be employed in some other examples of the client computing platform 104.

In this example, as shown, the first processor 202 may be configured to execute a space interface module 212, a chat interface module 214, a user response module 216, an assistance request module 218, and/or any other modules. The "module" referred to herein is any suitable software module, hardware, firmware or any suitable combination thereof that can perform the desired function, such as programmed processors, discrete logic, for example, state machine, to name a few. It is further understood that these modules may be included in the first processor 202 as part of the first processor 202, or a discrete component of the client computing platform 104 that can be executed by the first processor 202, such as software programs stored on computer readable storage medium that can be loaded into the client computing platform 104 and executed by the first processor 202. It is still understood that these modules may be combined in some other examples to form an integrated module that performs the combined functions of these modules as described herein. It is still understood the number of modules may vary in some other examples such that, for example, more than one space interface modules 212 may be included in the first processor 202. These modules may communicate with structures in the client computing platform 104 such as but not limited to the system memory 206, the second processors 204 and the frame buffer 208 via any suitable communication link, such as the system bus 210.

Also shown in this example is the second processor 204, operatively connected to the frame buffer 208 via any suitable communication link. The second processor 204 in this example is a graphics processing unit (GPU) that may be configured to process graphics information for a display, which is not shown in this example. The second processor 204 may be configured to receive graphics information 220 from the first processor 202, e.g., from an output of space interface module 212 and/or chat interface module 214. The second processor 204 may be configured to process graphics information to facilitate a presentation of the graphics information on the display. As shown, the second processor 204 may be connected to the frame buffer 208 for storing and retrieving information 224 to facilitate the processing of graphics information on the second processor 204.

As shown, the first processor 202 on the client computing platform client computing platform 104 may be configured to execute space interface module 212. The space interface module 212 may be configured to generate space interfaces on the display to the user. The space interfaces may be generated based on view information determined by the space module 106 as described in FIG. 1, and to present views of the virtual space to the user. The space interfaces may be generated to provide one or more virtual space controls to facilitate user actions in the virtual space. The facilitated actions may include user engagement in a combat and/or defense, virtual space maneuvers directing user character movements, inventory management, city management, construction of infrastructure, mining activities, virtual recourses and/or items trading or purchasing, transferring virtual resources, items and/or entities, picking up virtual space resources, and/or any other actions in the virtual space.

The chat interface module 214 may be configured to generate graphical chat interfaces to facilitate presentation of textual communications between the user associated with the client computing platform 104 and other users in the virtual space. For the pretention of the textual communications, the generated graphical chat interfaces may replace space interfaces generated by the space module 212 on the display. That is, when presented on the display, the generated chat interfaces and space interfaces are mutually exclusive such that the user may not access controls provided by the space interfaces when the chat interfaces are presented on the display, and vice versa.

To facilitate textual communications between the user associated with the client computing platform 104 and other users, the generated chat interface by the chat interface module 214 may present on the display the textual communications in a chat session. Chat sessions may be implemented in the chat interfaces by the chat interface module 214 through tabs: for example, a global chat tab for a global session and an alliance chat tab(s) for an alliance chat session(s) participated by the user associated with the client computing platform client computing platform 104. The chat interface module 214 may be configured to manage presentation of different chat sessions on the display for the user.

Communication inputs in a chat session may include assistance requests generated by the chat-request module 108. As described above, the assistance requests may be communicated through chat sessions by the chat module 110 using predetermined syntax. The chat interface module 214 may be configured to determine an assistance request from other type(s) communication inputs in the chat session. In some implementations, for such a determination, trigger conditions may be configured by provider, administrator, moderator, and/or any other entities with the chat interface module 214 based on the predetermined syntax for an assistance request communicated in a chat session.

Responsive to a determination that a communication input is an assistance request, the chat interface module 214 may be configured to generate visual display of the assistance request in the graphical chat interface. Examples of such a visual display may include an image, a graphical art, an animation, and/or any other visual display that may be generated to visually describe the assistance request.

The chat interface module 214 may be configured to generate one or more controls for the user associated with client computing platform 104 to provide inputs to the assistance request. The controls may enable corresponding actions the user may initiate responding to the assistance request. For example, buttons may be generated by the chat interface module 214 to allow the user to specify a response to the assistance request, e.g., accept, reject, or modify the assistance request. In cases where the user attempts to modify the terms of the assistance request, the chat interface module 214 may generate controls for the user to provide inputs to modify the terms. Such controls may include pull down menu, input box, dialog box, buttons, forms, radio box, sliding bar, and/or any other controls that may enable the user associated with the client computing platform 104. In some implementations, the generated graphical chat interface may include controls for a user to initiate a request for assistance through a chat session. Similar controls to those generated for a responding user to modify terms of assistance requests may be provided for the user to initiate an assistance request.

The user response module 216 may be configured to determine user responses to the assistance requests based on user inputs via the graphical chat interface generated by the chat interface module 214. In some implementations, for such a determination, the user response module 216 may be configured to parse the user inputs received from the graphical chat interface, extract assistance parameters from the received user inputs and determine user acceptance to the assistance request. Responsive to a determination of user acceptance to the assistance request, the user response module 216 may communicate the user acceptance to the requesting user through a chat session to the requesting user.

The assistance request module 218 may be configured to communicate assistance request through a chat session based on user inputs requesting assistance submitted through the graphical chat interface. In some implementations, for such a generation, the assistance request module 218 may be configured to generate communication inputs transmittable in a chat session by parsing the user inputs submitted through the graphical chat interface. Responsive to the generated communication inputs, the assistance request module may communicate the user assistance request to other users through the chat session.

Figure 3A:
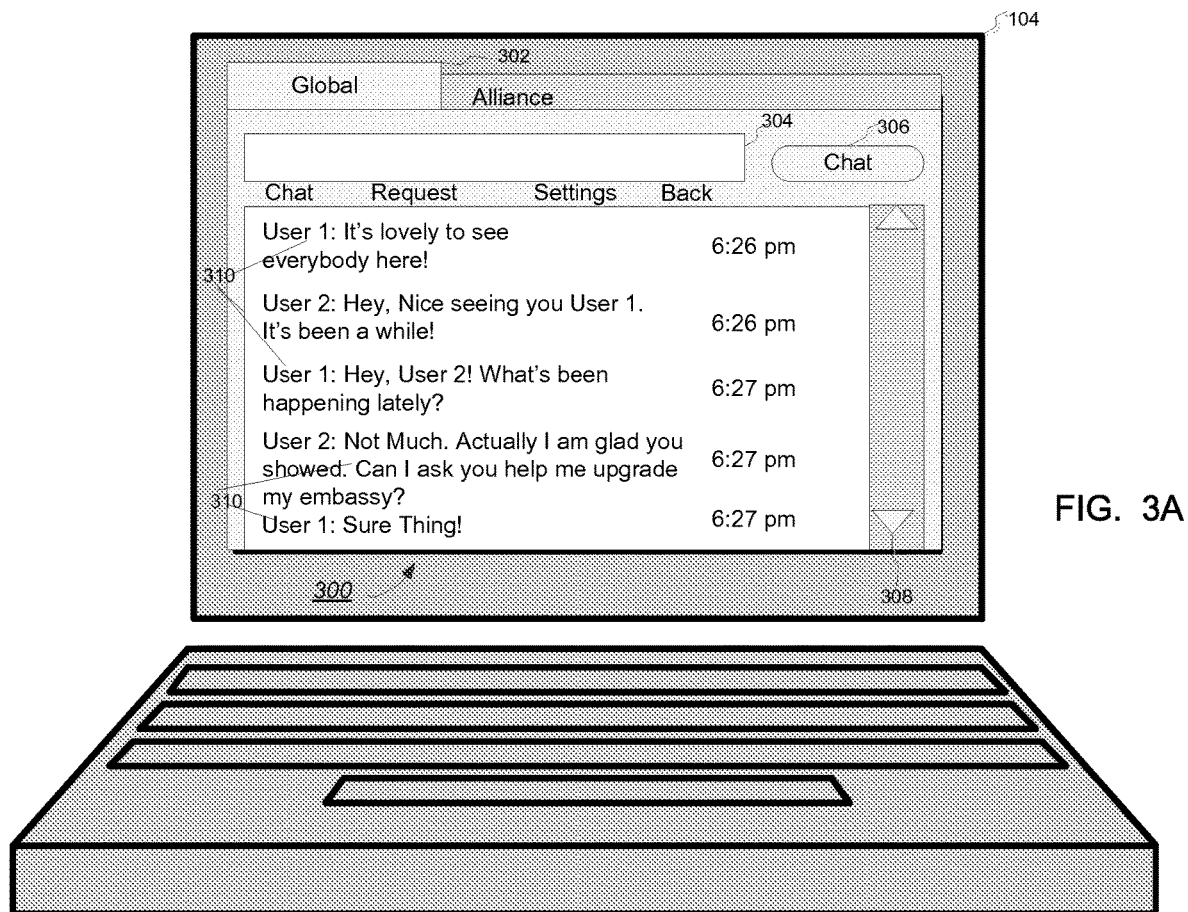
FIG. 3A illustrates one example of a graphical chat interface implemented on client computing platform in accordance with the disclosure.

FIG. 3A illustrates one example of a graphical chat interface 300 implemented on client computing platform 104 in accordance with the disclosure. It will be described with references to FIG. 1. As shown, the graphical chat interface 300 is presented on the client computing platform 104 exclusively such that it replaces any view of the virtual space. As illustrated, the graphical chat interface 300 may comprise tabs for chat sessions 302. In this example, two chat sessions are available through the graphical chat interface 300—a global chat session and an alliance chat session. As also shown, in this example, two users, user 1 and user 2, are engaging in textual communications through a global chat session 302. Their textual communications 310 may be input to the global chat session 302 through a text box 304 and a chat button 306 included in the graphical chat interface, as shown. The graphical chat interface 300 also comprises a scroll bar 308 to facilitate the textual communications between user 1 and user 2. As shown in this example, the user 2, through the global chat session, communicated to user 1 for assistance to upgrade user 2's embassy.

Figure 3B:
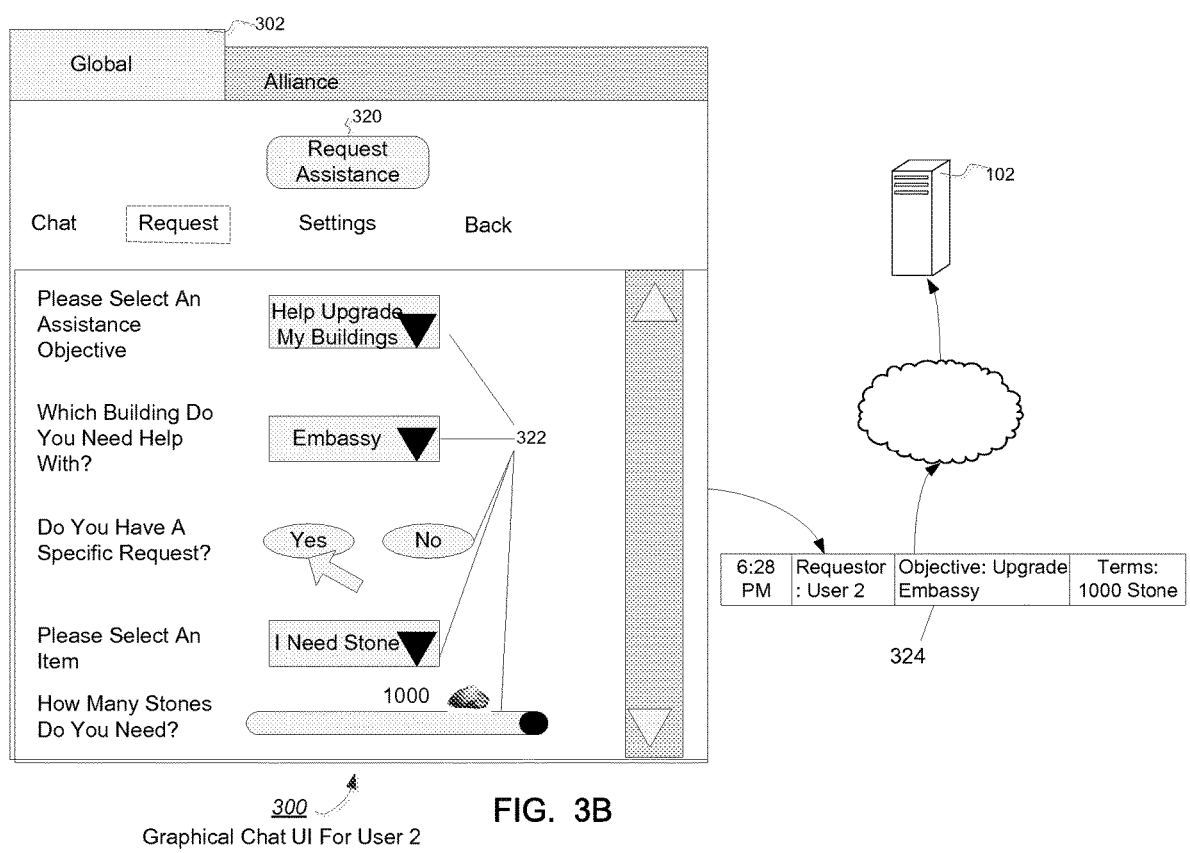
FIG. 3B illustrates an example of graphical chat interface facilitating a user to request an assistance request through a chat session.

FIG. 3B illustrates an example of graphical chat interface 300 facilitating a user to request an assistance request 324 through a chat session. In this example, the graphical chat interface 300 is generated for user 2 on a client computing platform client computing platform 104 associated with user 2. As shown in this example, user 2, in order to request assistance from user 1 as indicated in the textual communications illustrated in FIG. 3A, has selected a request tab provided by the graphical chat interface 300. As illustrated, graphical controls 322 are provided in the graphical chat interface 300 to facilitate user 2 to request assistance through the global chat session 302. As shown in this example, user 2, through pull down menu 322, has specified an assistance objective for the request, i.e., to help upgrade user 2's embassy and also specified that user 2 needs 1000 stone specifically for the upgrading of user 2's embassy. As shown, responsive to user 2's inputs specifying the requested assistance, an assistance request 324 may be generated, e.g., by the assistance request module 218. As shown, user 2 may initiate the request 324 to be communicated to user 1 through the global chat session 302 via server 102 by using the request assistance button 320.

Figure 3C:
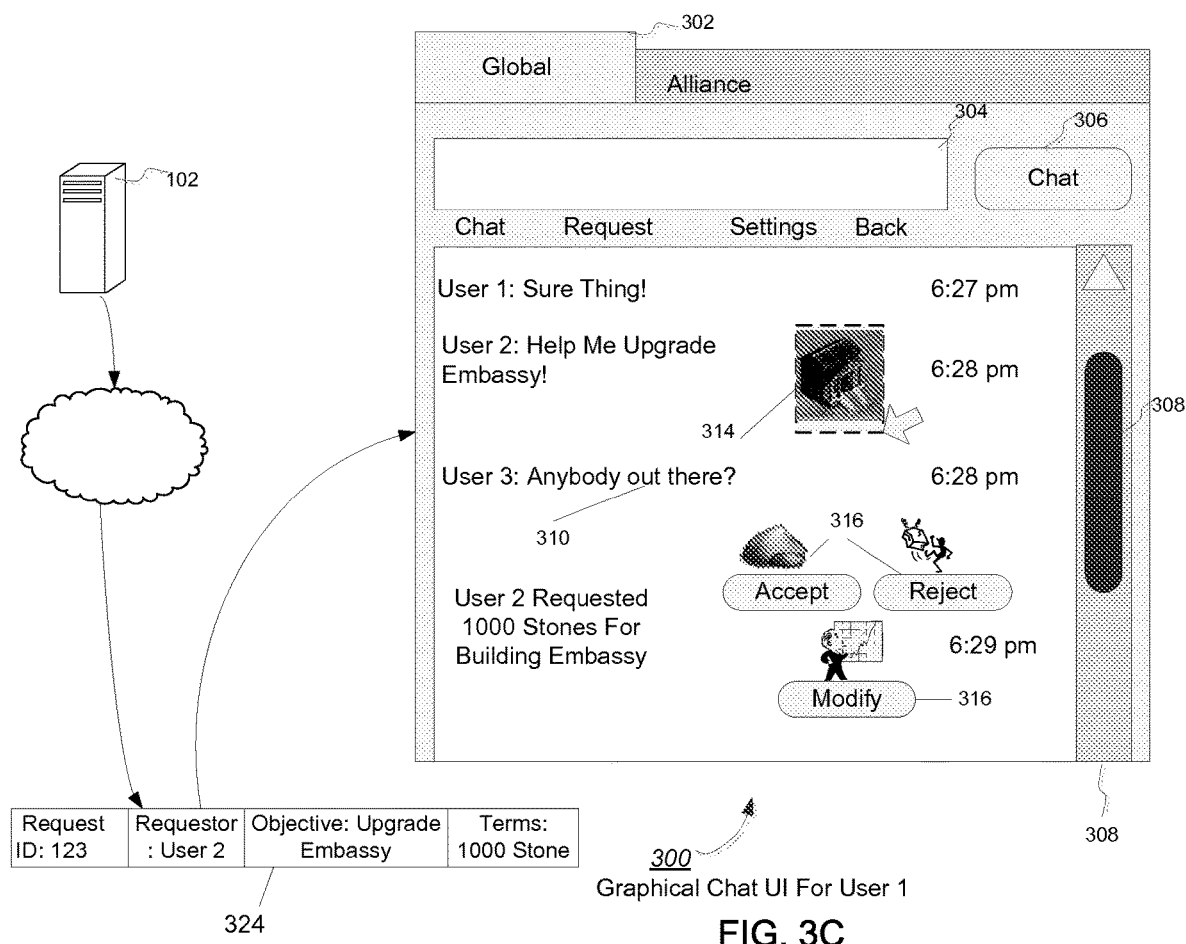
FIG. 3C illustrates an example of graphical chat interface facilitating a user to accept an assistance request communicated through a chat session.

FIG. 3C illustrates an example of graphical chat interface 300 facilitating a user to accept an assistance request communicated through a chat session. In this example, the graphical chat interface 300 is generated for user 1 on a client computing platform client computing platform 104 associated with user 1. As shown in this example, the assistance request 324 as illustrated in FIG. 3B has been communicated to user 1 through the global chat session 302 by the server 102. Responsive to the assistance request 324, the graphical chat interface 300 for user 1 generates a clickable graphic representation 314 for the assistance request 324 based on the assistance objective specified in the assistance request 324. As shown, in this example, user 1 accepts the assistance request 324 by clicking on the graphic representation 314, and the graphical chat interface 300 generates controls 316 for user 1 to accept the requested assistance, i.e., 1000 stones towards user 2's upgrade of the embassy as specified by the assistance request 324. As also shown in this example, other users such as user 3 may engage in textual communications 310 in the global chat session 302, and the textual communications by user 3 may be unrelated to the assistance requested by user 2 as illustrated.

FIGS. 3D-3E illustrate examples of graphical chat interface 300 facilitating a user to accept the assistance request 324 communicated through a chat session. In both examples, the graphical chat interface 300 is generated for user 1 on a client computing platform client computing platform 104 associated with user 1. As shown in FIG. 3D, user 1 through the controls 306 provided in the graphical chat interface 300 modifies an amount of stones as requested by the assistance request 324. As shown in this example, a sliding bar 318 may be provided in the graphical chat interface 300 for user 1 to modify the amount of stones in response to user 2's request. As shown in FIG. 3E, user 1 selects 300 stones to be transferred from user 2 to user 1. As a result, a response 326 for user 1 may be generated, for example, by the user response module 216 and may be communicated to user 2 through the global chat session 302 via server 102, as illustrated.

Figure 3F:
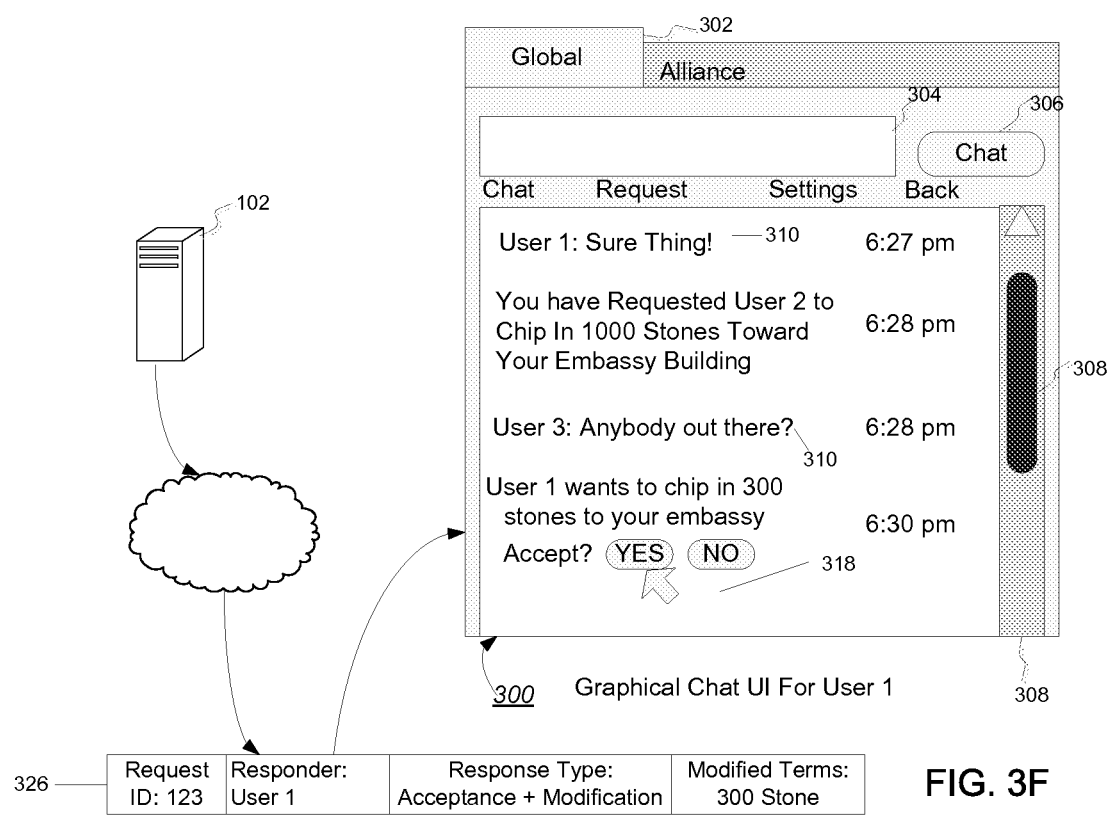
FIG. 3F illustrates an example of graphical chat interface facilitating a user to respond to a modified acceptance of assistance request.

FIG. 3F illustrates an example of graphical chat interface 300 facilitating a user to respond to a modified acceptance of assistance request 326. In this example, the graphical chat interface 300 is generated for user 2 on a client computing platform client computing platform 104 associated with user 2. As shown in this example, user 1's acceptance 326 has been communicated to user 2 through the global chat session 302 via server 102. As shown, responsive to the acceptance 326, the graphical chat interface 300 for user 2 may generate controls 318 for user 2 to respond to the modified assistance. In this example, as shown, user 2 has accepted the modified assistance by user 1, i.e., 300 stones instead of 1000 stones to be transferred to user 2 towards the embassy upgrading.

Figure 4A:
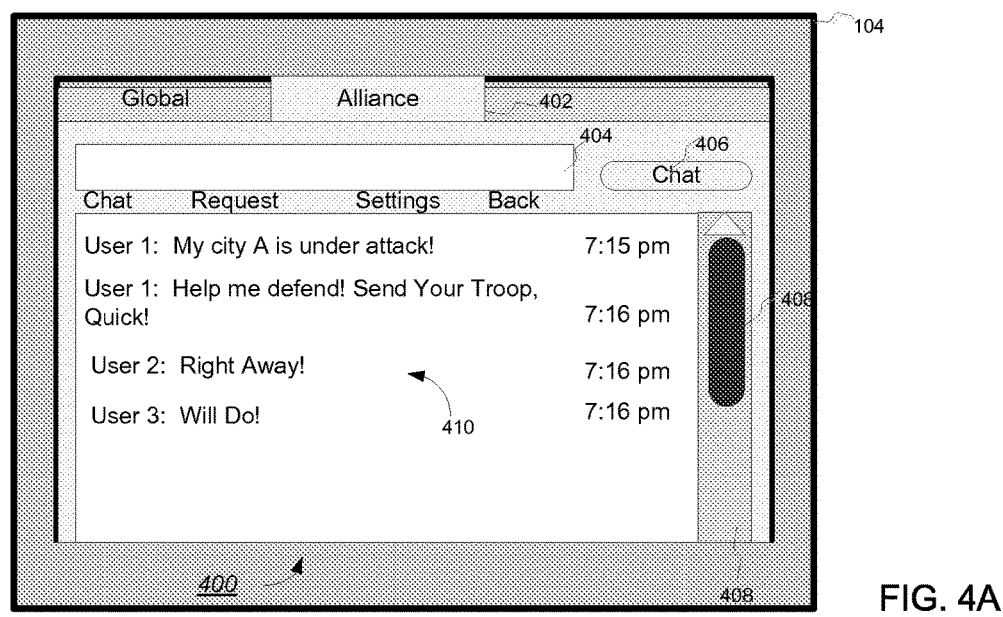
FIG. 4A illustrates another example of a graphical chat interface implemented on client computing platform 104 in accordance with the disclosure.

FIG. 4A illustrates one example of a graphical chat interface 400 implemented on client computing platform 104 in accordance with the disclosure. It will be described with references to FIG. 1. As shown, the graphical chat interface 400 is presented on the client computing platform 104 exclusively such that it replaces any view of the virtual space. As illustrated, the graphical chat interface 400 may comprise tabs for chat sessions 402. In this example, two chat sessions are available through the graphical chat interface 400—a global chat session and an alliance chat session. As also shown, in this example, three users, user 1, user 2 and user 3, are engaging with each other through an alliance chat session 402. Their textual communications 410 may be input to the alliance chat session 402 through a text box 404 and a chat button 406 included in the graphical chat interface 400, as shown. The graphical chat interface 400 also comprises a scroll bar 408 to facilitate the textual communications 410 between the users. As shown in this example, user 1, through the alliance chat session 402, communicated to user 2 and 3 for assistance for more troops to be sent to city A and to help user 1 to defend city A.

Figure 4B:
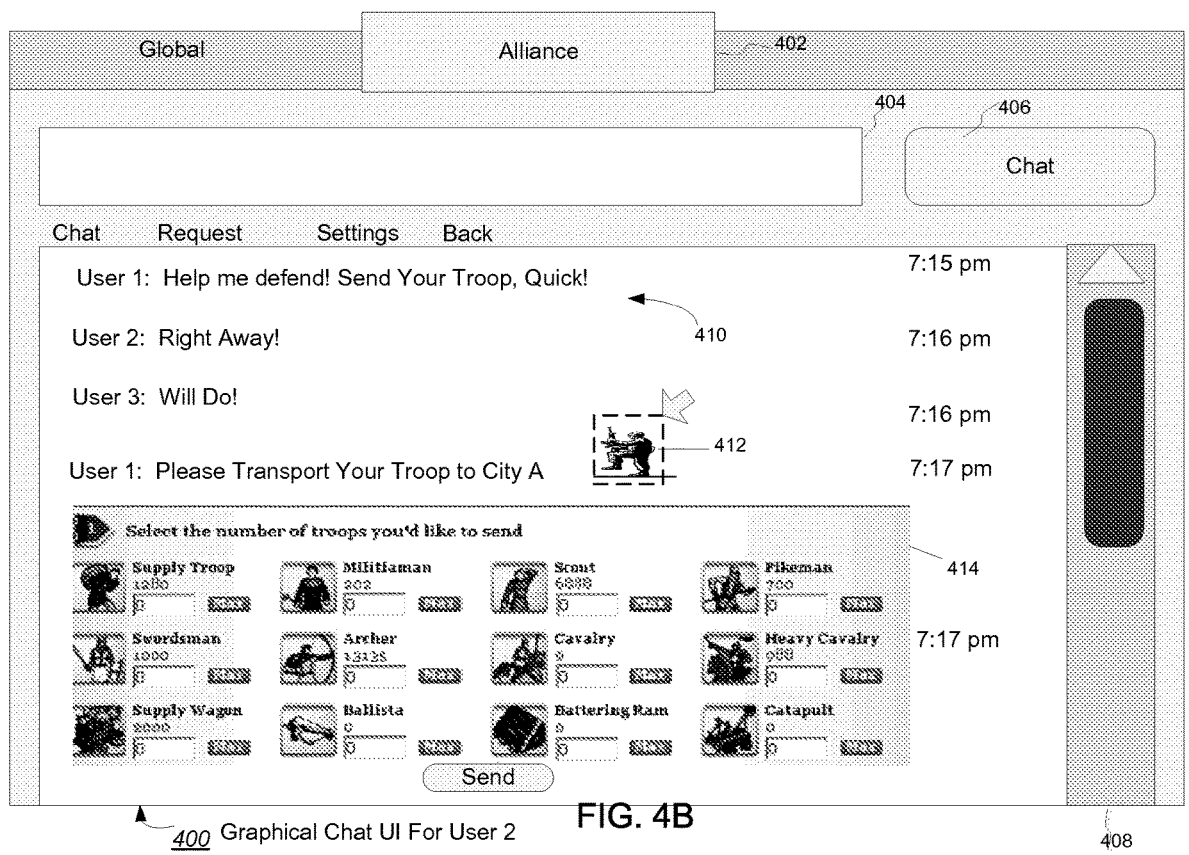
FIG. 4B illustrates an example of chat interface as shown in FIG. 4A facilitating a user to transport troops to a city through an alliance chat.

FIG. 4B illustrates an example of chat interface 400 as shown in FIG. 4A facilitating a user to transport troops to a city through an alliance chat. In this example, the graphical chat interface 400 is generated for user 2 on a client computing platform client computing platform 104 associated with user 2. As shown, the graphical chat interface 400, responsive to an assistance request from user 1 for transporting troops to city A, generates a clickable graphical representation 412 for the assistance request. In this example, user 2 has accepted the assistance request and the graphical chat interface 400 generates a control 414 for user 2 to specify types and number of troops that may be transported to city A.

Figure 4C:
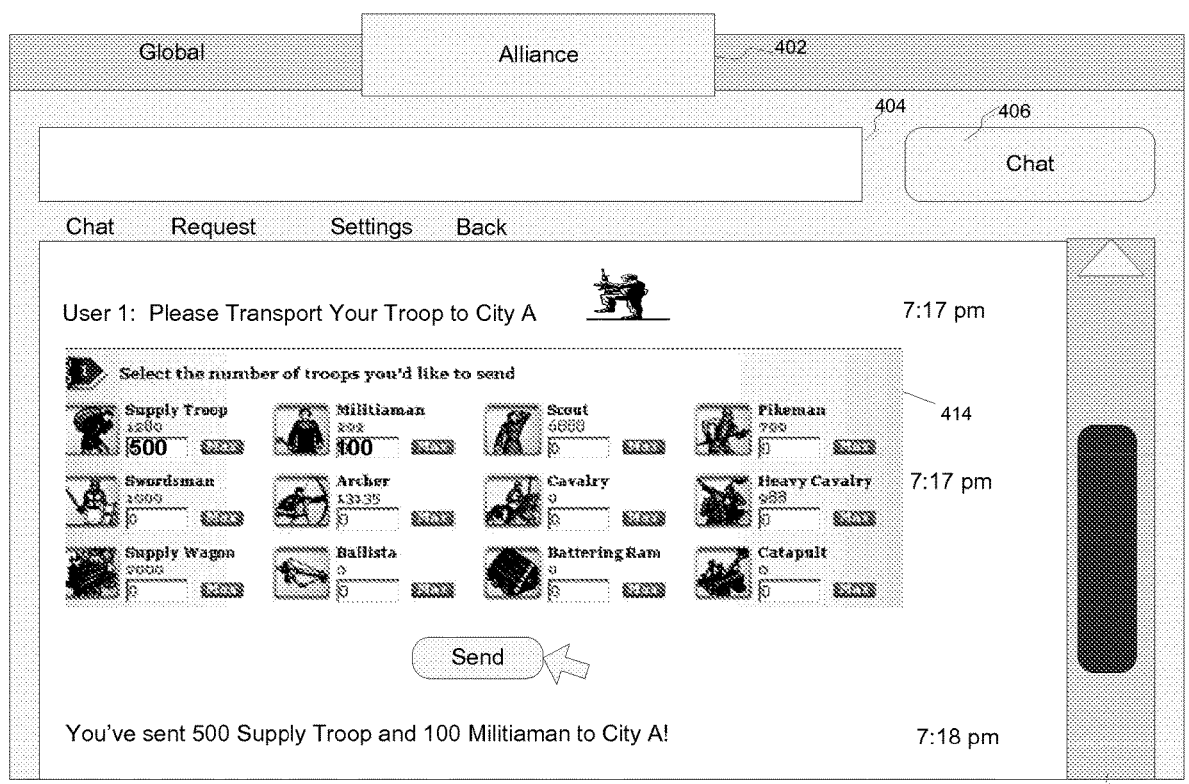
FIG. 4C illustrates an example of chat interface facilitating a user to specify types and amount of troops to be transported to a city in response to an assistance request in an alliance chat session.

FIG. 4C illustrates an example of chat interface 400 facilitating a user to specify types and amount of troops to be transported to a city in response to an assistance request in a chat session. As shown in this example, user 2 has specified to provide 500 supply troops and 100 militiamen in response to user 1's assistance request through controls 414 provided in the graphical chat interface 400.

Figure 4D:
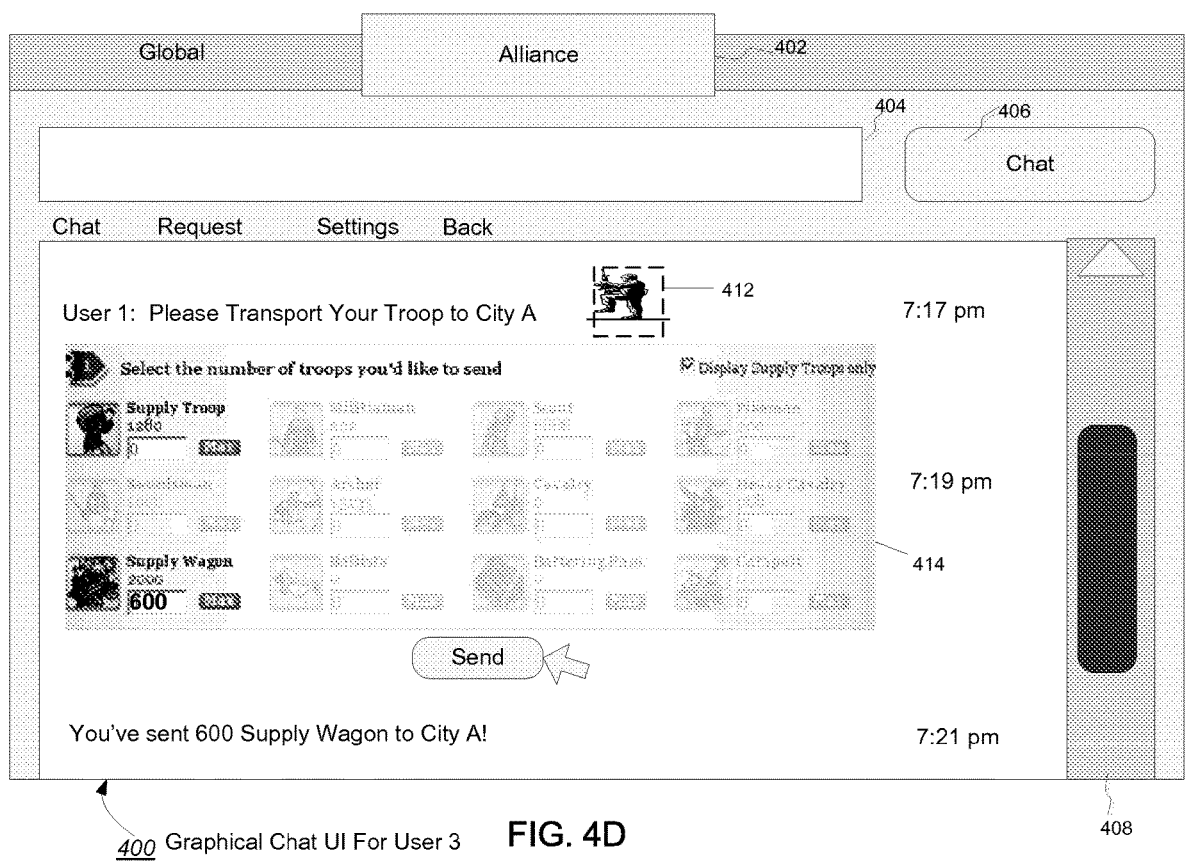
FIG. 4D illustrates another example of chat interface as shown in FIG. 4A facilitating a user to transport troops to a city through an alliance chat.

FIG. 4D illustrates an example of chat interface 400 as shown in FIG. 4A facilitating a user to transport troops to a city through an alliance chat. In this example, the graphical chat interface 400 is generated for user 3 on a client computing platform client computing platform 104 associated with user 3. As shown, the graphical chat interface 400, responsive to an assistance request from user 1 for transporting troops to city A, generates a clickable graphical representation 412 for the assistance request. In this example, user 3 has accepted the assistance request and the graphical chat interface 400 generates a control 414 for user 3 to specify types and number of troops that may be transported to city A. It should be noted, as shown in this example, the controls 414 generated for user 3 may be different from those generated for user 2 as shown in FIG. 4C. As illustrated, in this example, user 3 has chosen only to show supply troops in the control 414. As a result, options for transporting non-supply troops are disabled in control 414 for user 3. In this example, as shown, user 3 has specified to transport 600 supply wagons to city A in response to user 1's assistance request.

Figure 5:
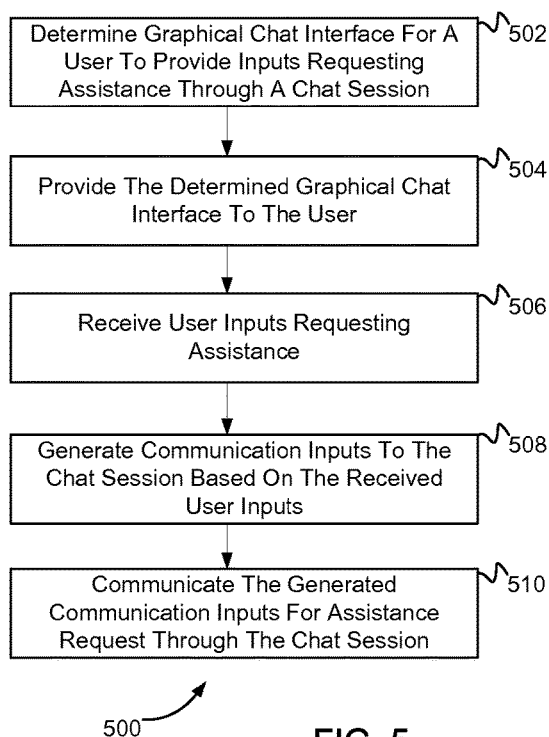
FIG. 5 illustrates an exemplary method of enabling a user to request assistance through a chat in accordance with the disclosure.

FIG. 5 illustrates a method 500 of enabling a user to request assistance through a chat in accordance with the disclosure. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 502, a graphical chat interface may be determined for a user to provide inputs to request assistance through a chat session. The determined graphical chat interfaces may comprise controls through which the user may specify assistance parameters such as objective, type, amount of virtual space resource, items, entities, and/or other virtual space elements to be transferred to the requesting user, and/or any other assistance parameters. In some implementations, operation 502 may be performed by a chat interface module the same as or similar to chat interface module 214 (shown in FIG. 2 and described herein).

At operation 504, the determined graphical chat interface may be presented to the user, e.g., on a client computing platform 104 associated with the user. In some implementations, operation 504 may be performed by a chat interface module the same as or similar to chat interface module 214 (shown in FIG. 2 and described herein).

At operation 506, user inputs requesting assistance may be received through the graphical chat interface provided to the user in operation 504. In some implementations, operation 506 may be performed by a chat interface module the same as or similar to chat interface module 214 (shown in FIG. 2 and described herein).

At operation 508, communication inputs to the chat session may be generated based on the user inputs received in the operation 506. In some implementations, operation 508 may be performed by an assistance request module the same as or similar to the assistance request module 218 (shown in FIG. 2 and described herein).

At operation 510, the communication inputs generated in the operation 508 may be communicated to other users through the chat session. In some implementations, operation 510 may be performed by a assistance request module the same as or similar to the assistance request module 218 (shown in FIG. 2 and described herein).

Figure 6:
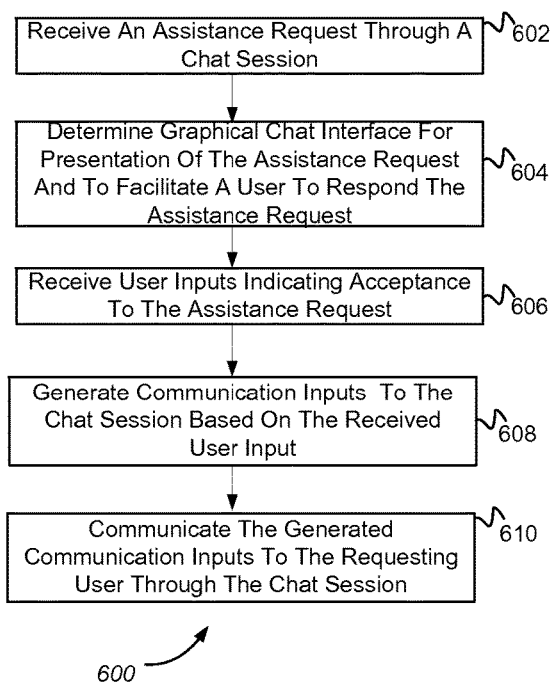
FIG. 6 illustrates an exemplary method of facilitating a user to accept an assistance request through a chat session.

FIG. 6 illustrates a method 600 of facilitating a user to accept an assistance request through a chat session. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 602, an assistance request may be received through a chat session. In some implementations, operation 602 may be performed by a chat interface module the same as or similar to chat interface module 214 (shown in FIG. 2 and described herein).

At operation 604, a graphical chat interface may be determined for presentation of the assistance request received in the operation 602. The determined graphical chat interface may facilitate a user to respond the assistance request received in operation 602. In some implementations, operation 604 may be performed by a chat interface module the same as or similar to chat interface module 214 (shown in FIG. 2 and described herein).

At operation 606, user inputs indicating acceptance to the assistance request may be received from the graphical chat interface determined in operation 604. In some implementations, operation 606 may be performed by a chat interface module the same as or similar to chat interface module 214 (shown in FIG. 2 and described herein).

At operation 608, communication inputs to the chat session may be generated based on the user inputs received in operation 606. In some implementations, operation 608 may be performed by a user response module the same as or similar to the user response module 216 (shown in FIG. 2 and described herein).

At operation 610, the communication inputs generated in the operation 608 may be communicated to the assistance requesting user through the chat session. In some implementations, operation 610 may be performed by a user response module the same as or similar to the user response module 216 (shown in FIG. 2 and described herein).

Figure 7:
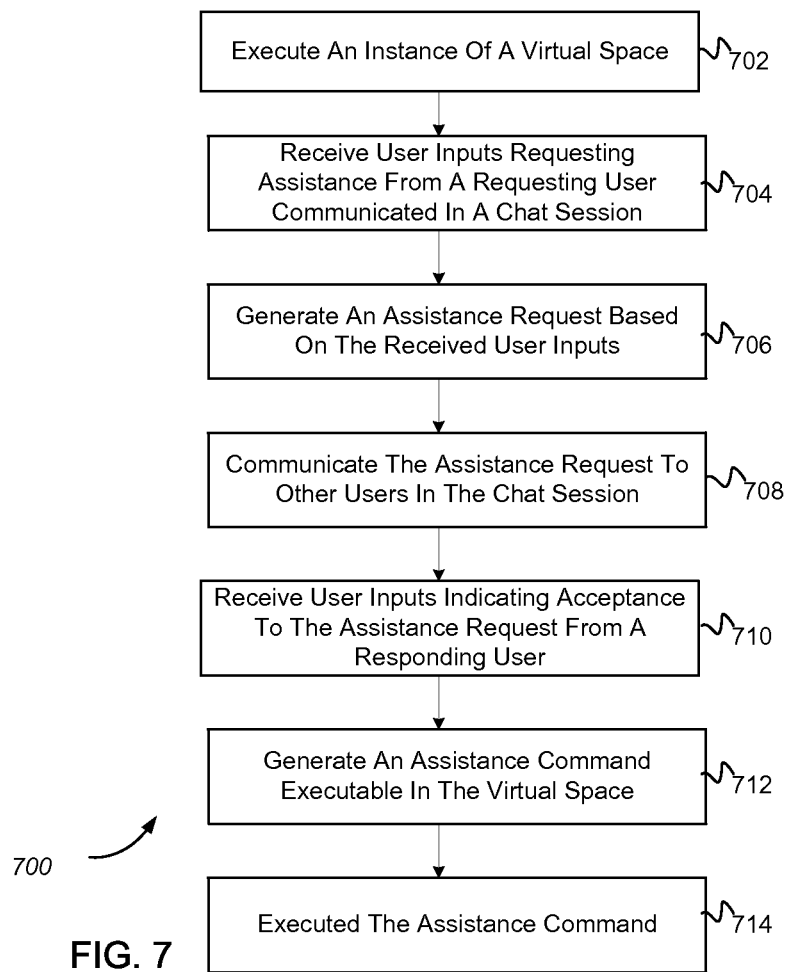
FIG. 7 illustrates an exemplary method of generating an assistance request and communicating the assistance request through a chat session.

FIG. 7 illustrates a method 700 of generating an assistance request and communicating the assistance request through a chat session. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At operation 702, an instance of a virtual space may be executed and implemented to determine view information for transmission to one or more client computing platforms associated with users. The users may participate in the virtual space by controlling entities therein. In some implementations, operation 702 may be performed by a space module the same as or similar to space module 106 (shown in FIG. 1 and described herein).

At operation 704, user inputs requesting assistance may be received from a requesting use through a chat session. In some implementations, operation 704 may be performed by a chat module the same as or similar to chat module 110 (shown in FIG. 1 and described herein).

At operation 706, an assistance request may be generated based on the user inputs received in operation 704. In some implementations, operation 706 may be performed by a chat-request module the same as or similar to chat-request module 108 (shown in FIG. 1 and described herein).

At operation 708, the assistance requests may be communicated other users in the chat session. In some implementations, operation 708 may be performed by a chat module the same as or similar to chat module 110 (shown in FIG. 1 and described herein).

At operation 710, user inputs indicating acceptance to the assistance request may be received from a responding user. In some implementations, operation 710 may be performed by a request-response module the same as or similar to response-request module 112 (shown in FIG. 1 and described herein).

At operation 712, an assistance command executable in the virtual space may be generated. In some implementations, operation 712 may be performed by a request-response module the same as or similar to response-request module 112 (shown in FIG. 1 and described herein).

At operation 714, the assistance command generated in operation 712 may be executed in the virtual space. In some implementations, operation 714 may be performed by a space module the same as or similar to space module 106 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate requests for assistance communicated through chat sessions, the system comprising:

a memory; and one or more processors coupled to the memory and configured by machine-readable instructions to:

execute an instance of an online game, to implement the instance of the online game by receiving and executing commands to facilitate user interactions with the online game, and to determine view information for presentation of the online game on client computing platforms through space interfaces to facilitate user actions in the online game, wherein the client computing platforms include a first client computing platform associated with a first user and a second client computing platform associated with a second user, wherein the space interfaces include a first space interface represented to the first user on the first client computing platform and a second space interface presented to the second user on the second client computing platform;

present graphical chat instances to facilitate textual communications between the users within the online game, wherein the graphical chat interfaces being presented on the client computing platforms such that the graphical chat interfaces include a first graphical chat interface presented to the first user and a second graphical chat interface presented to the second user such that the graphical chat interfaces replace at least part of the space interfaces to present the textual communications;

transmit the textual communications for presentation through the graphical chat interfaces, receive first user inputs from the first user requesting assistance, wherein the first user inputs are received through the first graphical chat interface; and effectuate communication of the requested assistance for presentation to the second user through the second graphical chat interface;

wherein the requested assistance requests one or more types of virtual resources, one or more virtual items, and/or one or more online game entities to be provided and/or transferred to the first users;

wherein the online game takes place within a virtual space.

2. The system of claim 1, wherein the textual communications are facilitated synchronously.

3. The system of claim 1, wherein the one or more processors are further configured by machine-readable instructions to generate a first assistance request based on the first user inputs received from the first user.

4. The system of claim 1, wherein communication of the requested assistance is effectuated through an alliance chat session the first and second users belong to.

5. The system of claim 1, wherein the one or more processors are further configured by machine-readable instructions to:
generate, responsive to receiving user inputs from a third user requesting assistance, a second assistance request and effectuate communication of the second assistance request to a fourth user through a chat session participated by the fourth user through a fourth graphical chat interface implemented on a given client computing platform associated with the fourth user.

6. A system configured to facilitate assistance requests within an instance of an online game, and implementing the instance of the online game, wherein the assistance requests include a first assistance request from a first user, the system comprising:
a memory; and
one or more processors coupled to the memory configured by machine-readable instructions to:
generate a space interface to present views of the online game on a display associated with a second user and/or to provide one or more controls for the second user to initiate actions in the online game;
generate a graphical chat interface to facilitate textual communications between the first and second user, wherein the graphical chat interface is presented to the second user such that it replaces at least part of the space interface, wherein the graphical chat interface includes visual display of the first assistance request and one or more controls enabling the second user to provide user inputs for responding to and/or modifying terms of the first assistance request;
receive a response to the first assistance request by the second user based on the user inputs provided by the second user through the graphical chat interface; and
effectuate communication of the response by the second user to the first user;
wherein the online game takes place within a virtual space.

7. The system of claim 6, wherein the textual communications are facilitated synchronously.

8. The system of claim 6, wherein the one or more processors are further configured by machine-readable instructions such that the graphical chat interface includes one or more controls enabling the second user to provide user inputs requesting assistance from other users.

9. The system of claim 6, wherein the one or more processors are further configured by machine-readable instructions such that the graphical chat interface comprises one or more controls for the second user to modify terms of the first assistance request.

10. A method for facilitating requests for assistance, the method being implemented in one or more physical processors configured by machine-readable instructions, the method comprising:
executing an instance of an online game and implementing the instance of the online game by receiving and executing commands to facilitate user interactions between users within the online game;
determining view information for presentation of the online game on client computing platforms through space interfaces to facilitate user actions in the online game, wherein the client computing platforms include a first client computing platform associated with a first user and a second client computing platform associated with a second user, wherein the space interfaces include a first space interface represented to the first user on the first client computing platform and a second space interface presented to the second user on the second client computing platform;
implementing an instance of a chat session to facilitate synchronous textual communications between users within the online game;
presenting graphical chat interfaces to facilitate textual communications between the users within the online game, wherein the graphical chat interfaces include a first graphical interface presented to the first user and a second graphical chat interface presented to the second user such that the graphical chat interfaces replace at least part of the space interfaces to present the textual communications;
transmitting the textual communications for presentation through graphical chat interfaces;
receiving first user inputs from the first user requesting assistance, wherein the first user inputs are received through the first graphical chat interface; and
effectuating communication of the requested assistance for presentation through the first graphical chat interface, wherein the requested assistance requests one or more types of virtual resources, one or more virtual items, and/or one or more online_game entities to be provided to and/or transferred to the first user,
wherein the online came takes place within a virtual space.

11. The method of claim 10, wherein the textual communications are facilitated synchronously.

12. The method of claim 10, further comprising:
generating a first assistance request based on the first user inputs received from the first user.

13. The method of claim 10, wherein the communication of the requested assistance is effectuated through an alliance chat session the first and second users belong to.

14. The method of claim 10, further comprising:
responsive to receiving user inputs from a third user requesting assistance, generating a second assistance request and effectuating communication of the second assistance request to a fourth user through a chat session participated by the fourth user through a fourth graphical chat interface implemented on a given client computing platform associated with the fourth user.

15. A method for facilitating assistance requests within an instance of an online game, wherein the assistance requests include a first assistance request from a first user, the method being implemented in one or more physical processors configured by machine-readable instructions, the method comprising:
generating a space interface to present views of the online game on a display associated with a second user and/or to provide one or more controls for the second user to initiate actions in the online game;
generating a graphical chat interface to facilitate textual communications between the first and second user, wherein the graphical chat interface is presented to the second user such that it replaces at least part of the space interface, wherein the graphical chat interface includes visual display of the first assistance request and one or more controls enabling the second user to provide user inputs for responding to and/or modifying terms of the first assistance request;

receiving a response to the first assistance request by the second user based on the user inputs provided by the second user through the graphical chat interface; and effectuating communication of the response by the second user to the first user;

wherein the online game takes place within a virtual space.

16. The method of claim 15, wherein the textual communications are facilitated synchronously.

17. The method of claim 15, wherein the graphical chat interface further includes one or more controls enabling the second user to provide user inputs requesting assistance from other users.

* * * * *